United States Patent
Kulkarni et al.

(10) Patent No.: US 11,916,496 B2
(45) Date of Patent: Feb. 27, 2024

(54) MOTOR CONTROLLER AND A METHOD FOR CONTROLLING A MOTOR

(71) Applicant: TEXAS INSTRUMENTS INCORPORATED, Dallas, TX (US)

(72) Inventors: Prasad Kulkarni, Bengaluru (IN); Venkata Pavan Mahankali, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 40 days.

(21) Appl. No.: 17/363,571

(22) Filed: Jun. 30, 2021

(65) Prior Publication Data

US 2023/0006585 A1 Jan. 5, 2023

(51) Int. Cl.
- H02P 21/00 (2016.01)
- H02P 21/18 (2016.01)
- H02P 21/22 (2016.01)

(52) U.S. Cl.
CPC .............. *H02P 21/18* (2016.02); *H02P 21/22* (2016.02); *H02P 2207/05* (2013.01)

(58) Field of Classification Search
CPC ................................ H02P 21/18; H02P 21/22
USPC .................................................... 318/400.02
See application file for complete search history.

(56) References Cited

U.S. PATENT DOCUMENTS

| 10,000,234 B2 | 6/2018 | Kim |
| 2003/0175018 A1 | 9/2003 | Heydt et al. |
| 2005/0140329 A1 | 6/2005 | Ihm |
| 2008/0114515 A1* | 5/2008 | Hara ..................... B62D 5/0466 701/42 |
| 2011/0074327 A1 | 3/2011 | Paintz et al. |
| 2012/0268052 A1 | 10/2012 | Nam et al. |

(Continued)

FOREIGN PATENT DOCUMENTS

| CN | 110350835 A | 10/2019 |
| DE | 10202110124 A1 | 10/2021 |

(Continued)

OTHER PUBLICATIONS

International Search Report in corresponding PCT Application No. PCT/US2022/035204, dated Oct. 21, 2022 (3 pages).

(Continued)

*Primary Examiner* — Erick D Glass
(74) *Attorney, Agent, or Firm* — John R. Pessetto; Frank D. Cimino

(57) ABSTRACT

A motor controller is operable to control a motor. The motor has a first terminal and the motor controller includes an angular velocity transmission path having an input and an output. A current generator includes a velocity-torque input, an angular position input, and a motor drive output. The velocity-torque input is coupled to the output of the angular velocity transmission path. An angular velocity feedback path is coupled between a first terminal and a first location on the angular velocity transmission path. The first location is between the input and the output of the angular velocity transmission path. A current feedback path is coupled between the first terminal and a second location on the angular velocity transmission path. The second location is disposed between the first location on the angular velocity transmission path and the velocity-torque input of the current generator.

19 Claims, 8 Drawing Sheets

(56) References Cited

U.S. PATENT DOCUMENTS

| | | | |
|---|---|---|---|
| 2014/0062364 A1 | 3/2014 | Petri et al. | |
| 2015/0372629 A1 | 12/2015 | Huang et al. | |
| 2016/0056740 A1 | 2/2016 | Nondahl | |
| 2016/0156297 A1* | 6/2016 | Takase | H02P 6/10 318/135 |
| 2017/0063271 A1 | 3/2017 | Murata | |
| 2017/0225979 A1* | 8/2017 | Nicholas | C05D 9/02 |
| 2018/0234043 A1 | 8/2018 | Hustedt et al. | |
| 2019/0386592 A1 | 12/2019 | Mogensen | |
| 2021/0028732 A1* | 1/2021 | Xu | H02P 21/36 |
| 2021/0211079 A1 | 7/2021 | Jian | |
| 2023/0327592 A1* | 10/2023 | Kojima | H02P 21/18 318/400.02 |

FOREIGN PATENT DOCUMENTS

| | | | |
|---|---|---|---|
| DE | 102021110214 A1 | 11/2021 | |
| EP | 1998435 B1 | 7/2013 | |
| EP | 2770626 A1 | 8/2014 | |
| JP | 2008220155 A | 9/2008 | |
| KR | 1020080085541 A | 9/2008 | |
| KR | 101635551 B1 | 7/2016 | |

OTHER PUBLICATIONS

International Search Report in corresponding PCT Application No. PCT/US2022/035460, dated Oct. 26, 2022 (3 pages).
Torres, Daniel et al. "Regenerative Braking of BLDC Motors"; Microchip.
Bist, Vashist; "Field Oriented Control (FOC) Made Easy for Brushless DC (BLDC) Motors using TI Smart Gate Drivers"; Application Brief; Texas Instruments; Jan. 2018; SLVA939B.
INFINEON; "Sensorless Field Oriented Control with Embedded Power SoC"; Application Note; Mar. 9, 2020; Z8F68474109.
Akin, Bilal et al.; "Sensorless Field Oriented Control of 3-Phase Permanent Magnet Synchronous Motors"; Texas Instruments; C2000 Systems and Applications Team; Mar. 2011; SPRABY9.
Texas Instruments; "Low-Voltage, 50-A Sensorless FOC for Brushless DC or Permanent-Magnet Synchronous Motors Reference Design"; TI Designs TIDM-1003; Jun. 2017; TIDUD29.
Frick, Charles; "Brushless DC Motors Introduction for Next-Generation Missile Actuation Systems Outline"; Analog Devices, Inc.; 2018.
English Translation, 110350835A, DI L.
Notice of Allowance in corresponding U.S. Appl. No. 17/364,540, dated May 23, 2023, 25 pgs.

* cited by examiner

MOTOR CONTROLLER AND A METHOD FOR CONTROLLING A MOTOR

BACKGROUND

Electric motors include a rotor and a stator having a plurality of windings. Brushless direct current (BLDC) motors are electronically commutated, wherein solid-state switching replaces the brushes and segmented commutators of traditional permanent magnet DC motors. In some BLDC motors, the rotor is or includes a permanent magnet. These permanent magnet BLDC motors operate by sequentially energizing the windings to attract or repel the permanent magnet rotor into rotational motion. Sensor-less BLDC motors often rely on back electromotive force (BEMF) detection to determine the angular position of the permanent magnet rotor.

SUMMARY

In one example, a motor controller is operable to control a motor. The motor has a first terminal and the motor controller includes an angular velocity transmission path having an input and an output. A current generator includes a velocity-torque input, an angular position input, and a motor drive output. The velocity-torque input is coupled to the output of the angular velocity transmission path. An angular velocity feedback path is coupled between a first terminal and a first location on the angular velocity transmission path. The first location is between the input and the output of the angular velocity transmission path. A current feedback path is coupled between the first terminal and a second location on the angular velocity transmission path. The second location is disposed between the first location on the angular velocity transmission path and the velocity-torque input of the current generator.

In one example, a method for controlling a motor includes determining an estimated angular velocity of a motor based on a measured current of the motor. An estimated angular position of the motor is determined based on the measured current of the motor. A calculated target current is determined based on a difference between the estimated angular velocity and a target angular velocity of the motor. The method further includes determining whether the target angular velocity of the motor is greater than a threshold angular velocity or less than the threshold angular velocity. A motor drive signal is generated based on the estimated angular position and the calculated target current while the target angular velocity is greater than the threshold angular velocity. The motor drive signal is generated based on a forced angular position and a forced target current while the target angular velocity is less than the threshold angular velocity.

In one example, a motor controller is operable to control a motor. The motor controller includes an angular position estimator circuitry, an angular velocity estimator circuitry, and a multiphase current generator. The angular position estimator circuitry is coupled to a first terminal, is configured to receive a measured current of the motor, and is configured to determine an estimated angular position of the motor based on the measured current. The angular velocity estimator circuitry is coupled to the first terminal, is configured to receive the measured current of the motor, and is configured to determine an estimated angular velocity of the motor based on the measured current. The multiphase current generator is coupled to a motor drive terminal, is selectively coupled to the angular position estimator circuitry, is configured to receive either the estimated angular position or a forced angular position of the motor, is configured to receive a motor control signal that is based on either a calculated target current or a forced target current, and is configured to generate a motor drive signal based on the motor control signal and either the estimated angular position or the forced angular position. The motor drive signal is based on the calculated target current and the estimated angular position while a target angular velocity is greater than a threshold angular velocity. The motor drive signal is based on the forced target current and the forced angular position while the target angular velocity is less than the threshold angular velocity.

BRIEF DESCRIPTION OF THE DRAWINGS

The same reference numbers and reference designators are used in the drawings to designate the same or similar (functionally and/or structurally) features.

DETAILED DESCRIPTION

Figure 1:
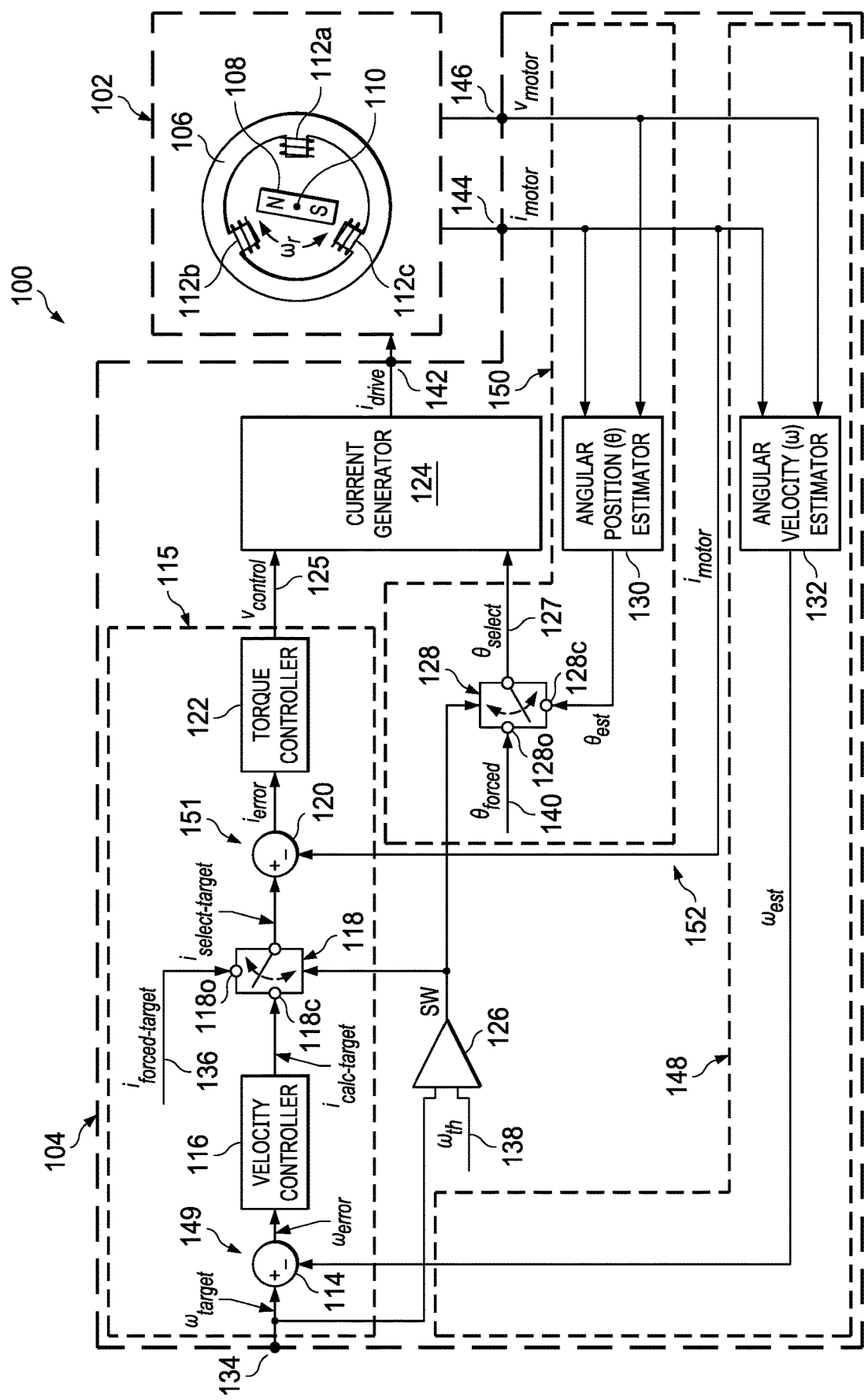
FIG. 1 is a block diagram of some examples of a BLDC motor system that includes a motor and a motor controller.

FIG. 1 shows an example of a BLDC motor system 100, which includes a motor 102 and a motor controller 104 in accordance with some embodiments.

The motor 102 includes a stator 106 and a rotor 108. The rotor 108 includes a permanent magnet and is configured to rotate about an axis 110. The stator 106 includes a plurality of conductive windings 112a-112c (e.g., a first winding 112a, a second winding 112b, and a third winding 112c that are spaced apart from one another, for example, by 120 degrees). In other examples, additional magnets can be present for the rotor 108 and/or additional conductive windings can be present on the stator 106. For example, six windings can be spaced apart from one another by 60-degrees, though other configurations are also possible.

To control the motor 102, the motor controller 104 includes an angular velocity transmission path 115, a current generator 124, an angular velocity feedback path 148, and an angular position feedback path 150. The angular velocity transmission path 115 extends between an input 134 and a velocity-torque input 125 of the current generator 124. The angular velocity transmission path 115 includes an angular velocity comparator 114, a velocity controller 116, first switching circuitry 118, a current comparator 120, and a torque controller 122, which are operably coupled as shown. The angular velocity feedback path 148, which includes an angular velocity estimator 132, is coupled between a motor feedback terminal (e.g., current feedback terminal 144 and/or voltage feedback terminal 146) and a first location 149 on the angular velocity transmission path 115, which can correspond to the angular velocity comparator 114. The angular position feedback path 150, which includes an angular position estimator 130 and second switching circuitry 128, extends between the motor feedback terminal (current feedback terminal 144 and/or voltage feedback terminal 146) and an angular position input 127 of the current generator 124. A comparator 126 is coupled to control terminals of the first and second switching circuities 118, 128.

During operation, angular velocity transmission path 115 provides a motor control signal $v_{control}$ (e.g., a motor voltage control signal) based on a target angular velocity $\omega_{target}$. Based on the motor control signal $v_{control}$, the current generator 124 provides a motor drive signal $i_{drive}$ to a motor drive terminal 142 (in some embodiments the motor drive signal includes one signal for each winding and is provided to the motor on one or more conductors—in some embodiments, the number of conductors is same as the number of windings) to control an angular velocity $\omega_r$ of the rotor 108. Thus, the motor controller 104 receives the target angular velocity signal $\omega_{target}$ on input 134, and the current generator 124 controls the motor drive signal $i_{drive}$ passing through the windings 112 of the stator 106 based on the target angular velocity signal $\omega_{target}$. This motor drive signal $i_{drive}$ passing through the windings 112a-112c exerts an electromagnetic force on the magnet of the rotor 108 and forces the rotor 108 to rotate at an angular velocity $\omega_r$, which can correspond to the target angular velocity $\omega_{target}$.

As the rotor rotates at angular velocity $\omega_r$, the angular velocity estimator 132 measures the motor current $i_{motor}$ and/or motor voltage $v_{motor}$ and determines an estimated angular velocity $\omega_{est}$ based on the measured motor current and/or the measured motor voltage. The angular position estimator 130 similarly determines an estimated angular position $\theta_{est}$ based on the measured motor current and/or the measured motor voltage. In some embodiments, the motor current $i_{motor}$ and/or motor voltage $v_{motor}$ are measured from two or more phases of the motor 102. In some other embodiments, the motor voltage $v_{motor}$ is instead reconstructed based on a DC voltage of the motor 102. Ideally, the estimated angular velocity $\omega_{est}$ is equal to the target angular velocity $\omega_{target}$, but in practical cases there may be some difference, from time-to-time, between these two values. Hence, the angular velocity feedback path 148 is coupled to the angular velocity comparator 114, and the angular velocity comparator 114 generates an angular velocity error signal $\omega_{error}$ that is used to adjust the motor drive signal $i_{drive}$ that drives the motor 102. Thus, if the angular velocity $\omega_r$ of the rotor 108 gets slightly out of sync with the target angular velocity $\omega_{target}$, the angular velocity error signal $\omega_{error}$ "tunes" the motor drive signal $i_{drive}$ provided to the windings 112 of the motor to get the rotor 108 back in sync with the target angular velocity $\omega_{target}$. Similarly, the estimated angular position $\theta_{est}$ can be used to adjust the motor drive signal $i_{drive}$ through the angular position feedback path 150.

Despite the angular velocity feedback path 148 and the angular position feedback path 150 generally keeping the angular velocity $\omega_r$ in sync with the target angular velocity $\omega_{target}$, in some instances the motor controller 104 may still experience challenges when controlling the motor 102 at low angular velocities and/or when reversing the angular velocity of the motor 102. In particular, the angular position estimator circuitry 130 and the angular velocity estimator circuitry 132 may be inaccurate when operating the motor 102 at low angular velocities and/or when reversing the angular velocity of the motor 102, and it becomes more likely that the motor 102 may lose synchronization and/or the motor may stall under these conditions.

Thus, the comparator 126 is configured to determine whether a magnitude of the target angular velocity $\omega_{target}$ is less than a magnitude of a predetermined threshold angular velocity $\omega_{th}$, from terminal 138, and outputs a switching signal SW to control terminals of the first and second switching circuitry 118, 128 to change between an open loop mode and a closed loop mode. More particularly, when the target angular velocity $\omega_{target}$ is greater than the predetermined threshold angular velocity $\omega_{th}$, the first switching circuitry 118 has its output coupled to first switching position 118c and concurrently the second switching circuitry 128 has its output coupled to third switching position 128c, thereby putting the motor controller in "closed loop" mode. During this closed loop mode, the angular velocity transmission path 115, current generator 124, and angular velocity feedback path 148 make a closed angular velocity loop with the motor 102; and concurrently the current generator 124 and angular position feedback path 150 make a closed angular position loop with the motor 102. Thus, during this closed loop mode, the estimated angular velocity $\omega_{est}$ and the estimated angular position $\theta_{est}$ are used to ongoingly "tune" the drive current to keep the angular velocity $\omega_r$ in sync with the target angular velocity $\omega_{target}$. In contrast, when the target angular velocity $\omega_{target}$ is less than or equal to the predetermined threshold angular velocity $\omega_{th}$, the first switching circuitry 118 has its output coupled to second switching position 118o and concurrently the second switching circuitry 128 has its output coupled to fourth switching position 128o, thereby putting the motor controller in "open loop" mode. In open loop mode, the angular velocity transmission path 115 and current generator 124 drive the motor 102 based on a forced target current $i_{forced-target}$, and not based on the estimated angular velocity $\omega_{est}$ (e.g., the angular velocity estimator 132 is de-coupled so the previously closed angular velocity loop is now "open"); and concurrently the current generator 124 drives the motor 102 based on the forced angular position $\theta_{forced}$ and not based on the estimated angular position $\theta_{est}$ (e.g., the angular position estimator 130 is de-coupled so the previously closed angular position feedback loop is now "open").

Because the first and second switching circuitries 118, 122 can selectively decouple the angular position estimator circuitry 130 and the angular velocity estimator circuitry 132 from the current generator 124 while the motor 102 is operating at low angular velocities and/or while reversing the velocity of the motor 102, the open loop mode for motor controller 104 prevents the inaccuracies associated with the angular position estimator circuitry 130 and the angular velocity estimator circuitry 132 from adversely affecting the operation of the motor 102. Further, the first switching circuitry 118 and the second switching circuitry 128 are configured to selectively couple the forced target current terminal 136 and the forced angular position terminal 140 to the current generator 124, respectively, while the motor 102 is operating at low angular velocities and/or while reversing the velocity of the motor 102. Hence, while operating the motor 102 at low angular velocities and/or while reversing the velocity of the motor 102, the current generator 124 is configured to generate the motor drive signal $i_{drive}$ based on the forced target current $i_{forced-target}$ received from the forced target current terminal 136 and based on the forced angular position $\theta_{forced}$ received from the forced angular position terminal 140 instead of based on the estimated angular velocity $\omega_{est}$ and the estimated angular position $\theta_{est}$.

By selectively switching from exciting the motor 102 based on the estimated angular position $\theta_{est}$ and the estimated angular velocity $\omega_{est}$ to exciting the motor 102 based on the forced target current $i_{forced-target}$ and the forced angular position $\theta_{forced}$ while operating the motor 102 at low angular velocities and/or while reversing the angular velocity of the motor 102, the motor controller 104 no longer drives the motor based on the potentially inaccurate estimated angular velocity $\omega_{est}$ and/or estimated angular position ° est at low velocities and/or during velocity reversal. As a result, the angular velocity $\omega_r$ of the rotor 108 may experience less deviation from the target angular velocity $\omega_{target}$ while the motor 102 is operating at low velocities and/or during velocity reversal. Thus, a likelihood that the motor 102 may lose synchronization may be decreased. In short, a performance and/or a reliability of the operation of the motor 102 at low velocities and/or velocity reversal may be improved.

Figure 2:
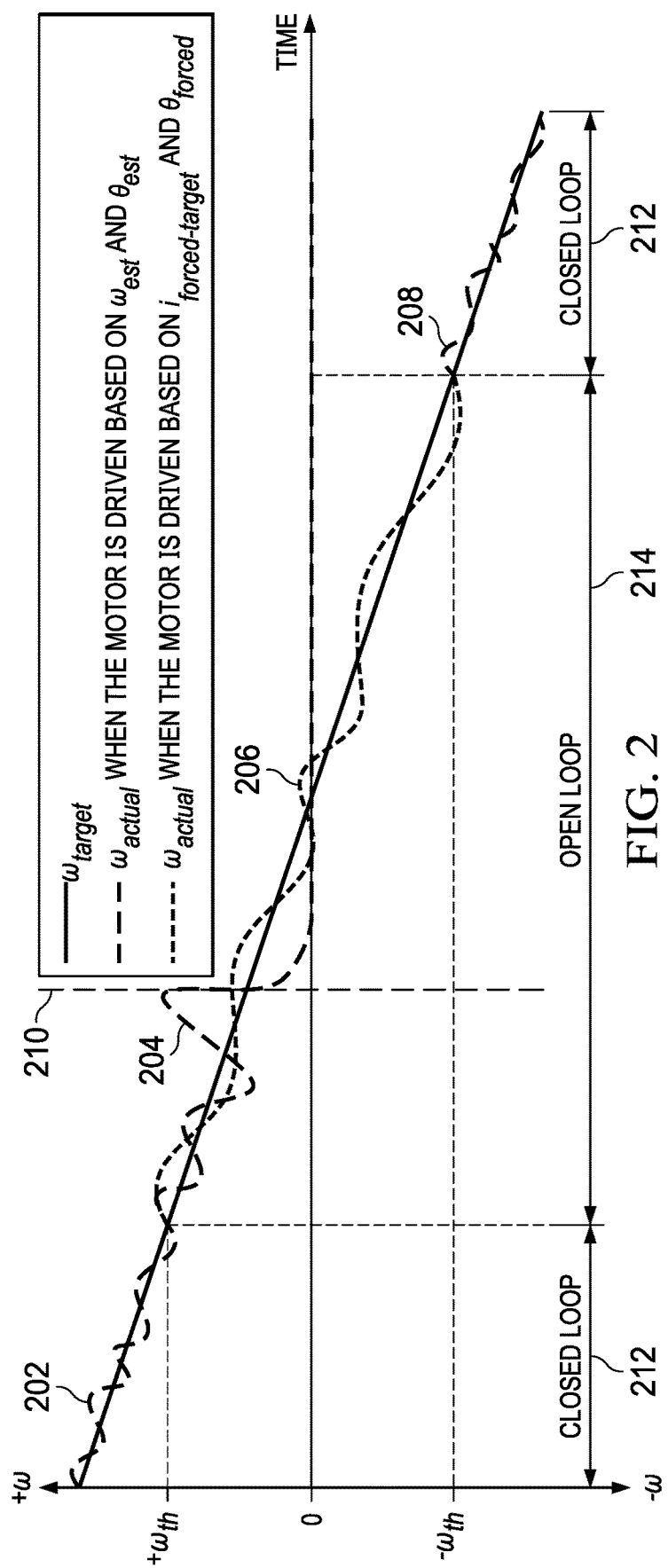
FIG. 2 is a graph of a target angular velocity and an actual angular velocity of a BLDC motor system over time.

Thus, as can be seen in FIG. 2, at larger angular velocities (e.g., angular velocities with magnitudes that are greater than a magnitude of a threshold angular velocity, $\omega_{th}$) the motor is driven in closed loop mode based on the estimated angular velocity $\omega_{est}$ and the estimated angular position $\theta_{est}$ (see curves 202, 208 during 212). Thus, at target angular velocities having a magnitude greater than a threshold angular velocity (e.g., ..$\omega_{target}|>|\omega_{th}|$), the closed loop mode keeps the angular velocity of the rotor generally in sync with the target angular velocity, with minor feedback corrections such that the angular velocity $\omega_r$ may exhibit small ripples that remain within +/−5% of the target angular velocity $\omega_{target}$. At lower angular velocities (e.g., $|\omega_{target}|\le|\omega_{th}|$), if the motor were still driven in closed loop mode, non-linearities could cause the actual angular velocity of the rotor $\omega_r$ to get out of sync with the target angular velocity $\omega_{target}$ (see curve 204). Thus, when the magnitude of the target angular velocity $\omega_{target}$ is less than the threshold angular velocity $\omega_{th}$, the motor 102 is driven in open loop mode. In open loop mode, the motor drive signal $i_{drive}$ is not based to be driven based on the forced target current $i_{forced-target}$ and the forced angular position $\theta_{forced}$, which are predetermined values for various target angular velocities. For example, the forced target current $i_{forced-target}$ can be a predetermined fixed value based on a target torque, and the forced angular position $\theta_{forced}$ at a given time can be predetermined based on the target angular velocity $\omega_{target}$ over time. In particular, in some examples the target angular velocity $\omega_{target}$ can follow equation 1 and/or equation 2 below, and the forced angular position $\theta_{forced}$ at a given time can be based on an integral of the target angular velocity $\omega_{target}$ over time. As shown by curve 206 in FIG. 2, under the open loop operation, the actual angular velocity still accurately tracks the target angular velocity even at low velocities during 214.

Further still, the motor controller of FIG. 1 also includes a current feedback path 152 coupled between the motor feedback terminal 144 and a second location 151 on the angular velocity transmission path 115. The second location 151 is disposed between the first location 149 on the angular velocity transmission path 115 and the current generator 124, and can correspond to the current comparator 120 as illustrated in FIG. 1.

The current comparator 120 is coupled to the velocity controller 116 and the motor current terminal 144. In some examples, the current comparator 120 generates a current error signal terror based on a difference between the selected target current $i_{select-target}$ (e.g., that is selected, by the first switching circuitry 118, to be either the calculated target current $i_{calc-target}$ or the forced target current $i_{forced-target}$ based on the switching signal SW) and the motor current $i_{motor}$. In turn, the motor drive signal $i_{drive}$ is generated by the current generator 124, based on the current error signal $i_{error}$. Thus, if the motor current $i_{motor}$ deviates slightly from the calculated target current $i_{calc-target}$, the current generator 124 is configured to "tune" the motor drive signal $i_{drive}$ based on the current error signal $i_{error}$ to reduce the difference between the calculated target current $i_{calc-target}$ and the to motor current $i_{motor}$. In some examples, the current feedback path 152 may be referred to as a torque feedback path because the calculated target current-talc-target corresponds to a target torque of the motor 102, the motor current $i_{motor}$ corresponds to a torque generated by the motor 102, and the current error signal $i_{error}$ corresponds to a difference between a target torque of the motor 102 and a measured torque of the motor 102.

Further, the current error signal $i_{error}$ is provided to a torque controller 122 (e.g., a current controller). The torque controller 122 generates the motor control signal $v_{control}$ based on the current error signal $i_{error}$. In turn, in some examples, the current generator 124 is configured to generate the motor drive signal $i_{drive}$ based on the motor control signal $v_{control}$ and the estimated angular position $\theta_{est}$.

In some examples, the motor controller 104 is configured to change the sign forced target current $i_{forced-target}$ when the target angular velocity $\omega_{target}$ reaches zero to cause the motor 102 to rotate in an opposite direction (e.g., to reverse the velocity of the motor 102). For example, the first switching circuitry 118 may be configured to change the sign forced target current $i_{forced-target}$ when the target angular velocity $\omega_{target}$ reaches zero.

Some motor systems may alternatively use an "open-loop voltage control" system when operating at low velocities and/or during velocity reversal to avoid dependency on angular velocity and/or angular position estimators. For example, some such motor systems may provide a forced voltage to a current generator and a forced angular position to the current generator, and the current generator may generate a motor drive signal based on the forced voltage and the forced angular position. However, a challenge with some "open-loop voltage control" systems is that because a power of the motor may decrease as velocity approaches and/or crosses zero, and because the voltage is forced (e.g., fixed), the current of the motor 102 is decreased (e.g., because P=IV). Thus, the torque generated by the motor is decreased. In some cases, the torque generated by the motor may be reduced to below a load torque or to zero. As a result, the motor may lose synchronization and/or the motor may stall. Thus, the performance and/or the reliability of "open-loop voltage control" systems may be reduced when operating at low velocities and/or during velocity reversal.

In contrast, by using the "open-loop current control" when operating the motor 102 at low velocities and/or during velocity reversal in accordance with examples of the present description, the current of the motor 102 (e.g., the forced target current $i_{forced-target}$ and/or the motor current $i_{motor}$) can be independently controlled, and hence the motor controller 104 can prevent the torque generated by the motor 102 from dropping below a load torque. As a result, a likelihood that the motor 102 may lose synchronization and/or stall at low velocities and/or during velocity reversal may be reduced. Thus, motor performance and/or reliability may be improved.

In place of the angular velocity estimator circuitry 132 and/or the angular position estimator circuitry 130, some other motor systems may use one or more sensors (e.g., magnetic field sensors) to directly measure the angular velocity and/or angular position of a rotor. Such sensors may be advantageous in some regards in that they may help ensure the motor remain in synchronization while the motor operates (e.g., at low velocities and/or during velocity reversal). However, these sensors also add additional cost to the motor system and may be prone to failure. By using a sensor-less motor system as shown in the BLDC motor system 100 of FIG. 1, the BLDC motor system 100 may be less expensive and/or more reliable.

Figure 3:
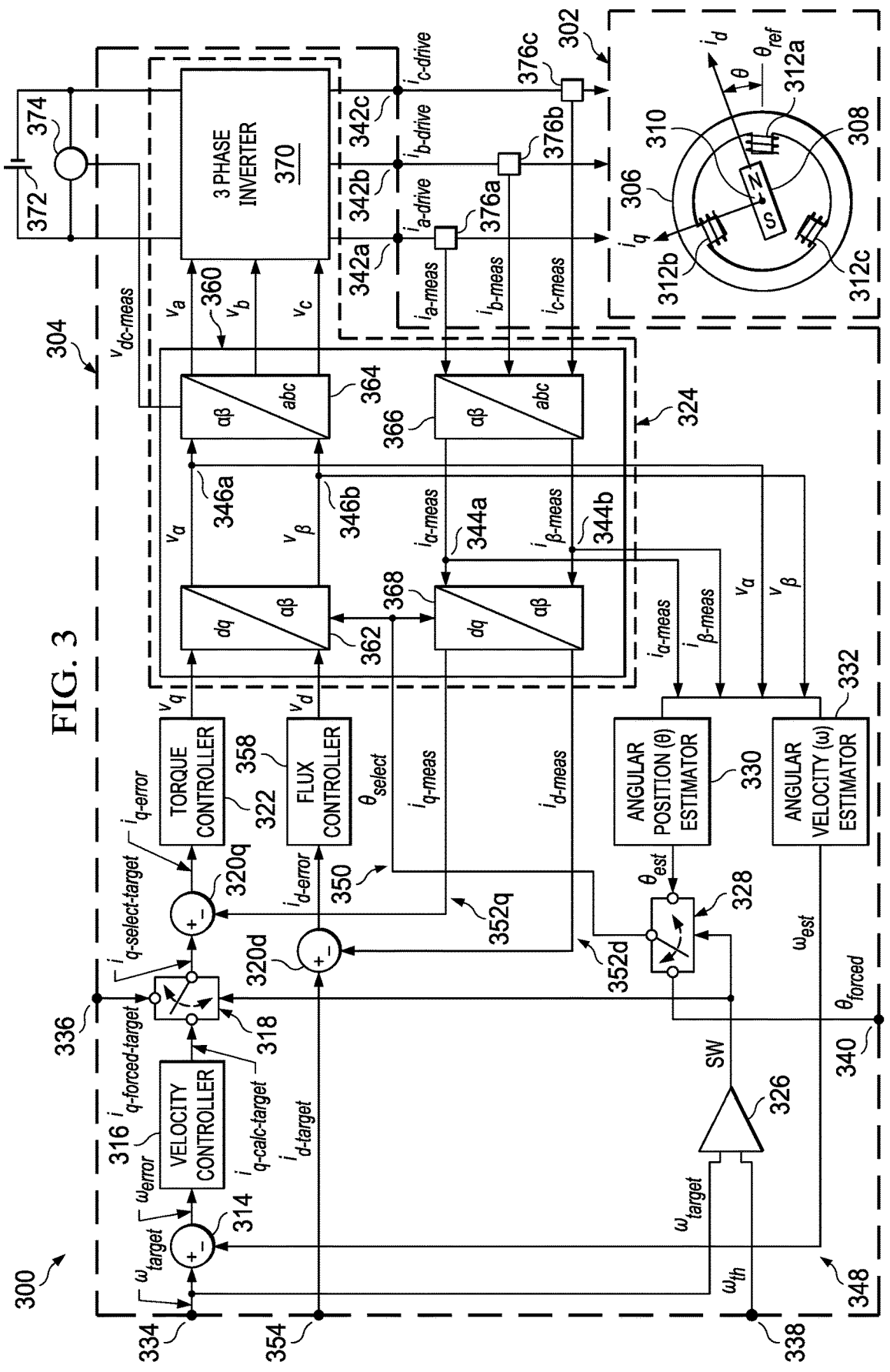
FIG. 3 is a block diagram of some examples of a BLDC motor system that includes a motor and a motor controller.

FIG. 3 is a diagram of examples of a BLDC motor system 300 that includes a motor 302 and a motor controller 304.

The BLDC motor system 300 is similar to the BLDC motor system 100 of FIG. 1. For example, the BLDC motor system 300 includes a motor 302 and a motor controller 304. The motor 302 includes a stator 306 and a rotor 308 that is configured to rotate about an axis 310. The motor 302 also includes a plurality of windings 312a-312c. The motor controller 304 includes a target velocity input terminal 334, a velocity comparator 314, a velocity controller 316, a first switching circuitry 318, a forced target current terminal 336, a torque controller 322, a current generator 324, a threshold comparator 326, a threshold angular velocity terminal 338, a second switching circuitry 328, a forced angular position terminal 340, an angular position estimator circuitry 330, an angular velocity estimator circuitry 332, a velocity feedback loop 348, and an angular position feedback loop 350.

In addition, the motor controller 304 includes a q-axis current comparator 320q, a d-axis current input terminal 354, a d-axis current comparator 320d, a flux controller 358, a DC voltage source 372, a DC voltage meter 374, three motor drive terminals 342a-342c (e.g., an A-phase motor drive terminal 342a, a B-phase motor drive terminal 342b, and a C-phase motor drive terminal 342c), three current meters 376a-376c (e.g., an A-phase current meter 376a, a B-phase current meter 376b, and a C-phase current meter 376c), a d-axis current feedback loop 352d, and a q-axis current feedback loop 352q. Further, the current generator 324 includes transform circuitry 360 and a three phase inverter 370. The transform circuitry 360 includes an inverse-Park transform circuit 362, an inverse-Clarke transform circuit 364, a Clarke transform circuit 366, and a Park transform circuit 368. In some embodiments, the number of motor drive terminals 342a-342c corresponds to the number of motor windings 312a-312c.

The q-axis current comparator 320q is coupled to the first switching circuitry 318, the torque controller 322, and the Park transform circuit 368. The d-axis current comparator 320d is coupled to the d-axis current input terminal 354, the flux controller 358, and the Park transform circuit 368. The inverse-Parke transform circuit 362 is coupled to the torque controller 322, the flux controller 358, the inverse-Clarke transform circuit 364, and the second switching circuitry 328. The three phase inverter 370 is coupled to the inverse-Clarke transform circuit 364, the motor 302 (e.g., via the three motor drive terminals 342a-342c), and the DC voltage source 372. The DC voltage meter 374 is coupled to the DC voltage source 372 and to the inverse-Clarke transform circuit 364. The three current meters 376a-376c are coupled between the three phase inverter 370 and the motor 302, and are further coupled to the Clarke transform circuit 366. The Park transform circuit 368 is coupled to the Clarke transform circuit 366, the q-axis current comparator 320q, the d-axis current comparator 320d, and the second switching circuitry 328.

An α-axis motor voltage node 346a and a β-axis motor voltage node 346b are coupled between the inverse-Park transform circuit 362 and the inverse-Clarke transform circuit 364. An a-axis motor current node 344a and a β-axis motor current node 344b are coupled between the Clarke transform circuit 366 and the Park transform circuit 368. The α-axis motor voltage node 346a, the β-axis motor voltage node 346b, the α-axis motor current node 344a, and the β-axis motor current node 344b are coupled to the angular position estimator circuitry 330 and to the angular velocity estimator circuitry 332.

An α-axis and a β-axis are used to define α vector in a two phase stationary reference frame system. For example, a net current vector of three phase current vectors can be represented using two stationary phase current vectors: an α vector and a β vector. The transformation from a three phase system to a two phase stationary reference frame system is referred to as the Clarke transform.

A q-axis (e.g., quadrature axis), a d-axis (e.g., direct axis), and an angle are used to define a vector in a two phase rotating reference frame system, as shown in FIG. 3. For example, a net current vector of an α vector and a β vector can be represented using two rotating current vectors and an angle: a d-vector, a q-vector, and an angle. The transformation from the two phase stationary reference frame system to the two phase rotating reference frame system is referred to as the Park transform.

The rotating reference frame system is often used in field oriented control systems. For example, in field oriented control systems, the motor current vector is represented using a d-component $i_d$, a q-component $i_q$, and an angle θ. The d-component $i_d$ of the motor current vector is aligned with the rotor 308, the q-component $i_q$ of the current vector leads the d-component $i_d$ by 90 degrees, and the angle θ is an angle between the d-component and a reference angle $θ_{ref}$, as shown in FIG. 3. In some field oriented control systems, the q-component $i_q$ of the motor current is driven to the desired motor current and the d-component $i_d$ of the motor is driven to zero so that the motor current produces a maximum torque on the rotor 308.

The q-axis path of the motor controller 304 includes the target velocity input terminal 334, the velocity comparator 314, the velocity controller 316, the first switching circuitry 318, the q-axis current comparator 320q, and the torque controller 322. The velocity controller 316 provides a q-axis calculated target current $i_{q\text{-}calc\text{-}target}$ to the first switching circuitry 318 based on a velocity error signal $ω_{error}$. The forced target current input terminal 336 provides a q-axis forced target current $i_{q\text{-}forced\text{-}target}$ to the first switching circuitry 318. The first switching circuitry 318 selects a q-axis selected target current $i_{q\text{-}select\text{-}target}$ based on the switching signal SW and provides the q-axis selected target current $i_{q\text{-}select\text{-}target}$ to the q-axis current comparator 320q. The q-axis current comparator 320q generates a q-axis current error signal $i_{q\text{-}error}$ based on a difference between the q-axis selected target current $i_{q\text{-}select\text{-}target}$ and a q-axis measured current $i_{q\text{-}meas}$. The q-axis current comparator 320q provides the q-axis current error signal $i_{q\text{-}error}$ to the torque controller 322. The torque controller 322 generates a q-axis voltage $v_q$ (e.g., a q-axis motor control signal) based on the q-axis current error signal $i_{q\text{-}error}$. In some examples, the q-axis measured current $i_{q\text{-}meas}$ corresponds to the q-component $i_q$ of the motor current as discussed with regard to field oriented control systems.

The d-axis path of the motor controller 304 includes a d-axis current input terminal 354, a d-axis current comparator 320d, and flux controller 358. A d-axis target current $i_{d\text{-}target}$ is provided to the d-axis current comparator 320d via the d-axis current input terminal 354. The d-axis current comparator 320d outputs a d-axis current error signal $i_{d\text{-}error}$ based on a difference between the d-axis target current $i_{d\text{-}target}$ and a d-axis measured current $i_{d\text{-}meas}$. The d-axis current comparator 320d provides the d-axis current error signal $i_{d\text{-}error}$ to the flux controller 358. The flux controller 358 generates a d-axis voltage $v_d$ (e.g., a d-axis motor control signal) based on the d-axis current error signal $i_{d\text{-}error}$. The d-axis target current $i_{d\text{-}target}$ may be driven to zero to maximize the torque generated by the motor 302, as discussed with regard to field oriented control systems. In some examples, the d-axis measured current $i_{d\text{-}meas}$ corresponds to the d-component $i_d$ of the motor current as discussed with regard to field oriented control systems.

The q-axis voltage $v_q$ and the d-axis voltage $v_d$ are provided to the inverse-Park transform circuit 362. The inverse-Park transform circuit 362 generates an α-axis voltage $v_\alpha$ and a β-axis voltage $v_\beta$ based on the q-axis voltage $v_q$, the d-axis voltage $v_d$, and a selected angular position $\theta_{select}$ that is selected by the second switching circuitry 328 based on the switching signal SW. The α-axis voltage $v_\alpha$ and the β-axis voltage $v_\beta$ are provided to the inverse-Clarke transform circuit 364. The inverse-Clark transform circuit 364 generates an A-phase voltage $v_a$, a B-phase voltage $v_b$, and a C-phase voltage $v_c$ based on the α-axis voltage $v_\alpha$, the β-axis voltage $v_\beta$, and a measured DC voltage $v_{dc\text{-}meas}$ of the DC voltage source 372. The A-phase voltage $v_a$, the B-phase voltage $v_b$, and the C-phase voltage $v_c$ are provided to the three phase inverter 370. The three phase inverter 370 generates an A-phase drive current $i_{a\text{-}drive}$, a B-phase drive current $i_{b\text{-}drive}$, and a C-phase drive current $i_{c\text{-}drive}$ based on the A-phase voltage $v_a$, the B-phase voltage $v_b$, and the C-phase voltage $v_c$. The A-phase drive current $i_{a\text{-}drive}$, the B-phase drive current $i_{b\text{-}drive}$, and the C-phase drive current $i_{c\text{-}drive}$ are provided to the motor 302 via the motor drive terminals 342a, 342b and 342c, respectively, to drive the motor 302. The A-phase drive current $i_{a\text{-}drive}$, the B-phase drive current $i_{b\text{-}drive}$, and the C-phase drive current $i_{c\text{-}drive}$ are measured by the three current meters 376a, 376b and 376c, respectively, and the three current meters 376a-376c provide an A-phase measured current $i_{a\text{-}meas}$, a B-phase measured current $i_{b\text{-}meas}$, and a C-phase measured current $i_{c\text{-}meas}$ to the Clarke transform circuit 366. The Clarke transform circuit 366 generates an α-axis measured current $i_{\alpha\text{-}meas}$ and a β-axis measured current $i_{\beta\text{-}meas}$ based on the A-phase measured current $i_{a\text{-}meas}$, the B-phase measured current $i_{b\text{-}meas}$, and the C-phase measured current $i_{c\text{-}meas}$. The Clarke transform circuit 366 provides the α-axis measured current is-meas and the β-axis measured current $i_{\beta\text{-}meas}$ to the Park transform circuit 368. The Park transform circuit 368 generates the d-axis measured current $i_{d\text{-}meas}$ and the q-axis measured current $i_{q\text{-}meas}$ based on the α-axis measured current $i_{\alpha\text{-}meas}$, the β-axis measured current $i_{\beta\text{-}meas}$, and a selected angular position $\theta_{select}$. The Park transform circuit 368 provides the d-axis measured current $i_{d\text{-}meas}$ and the q-axis measured current $i_{q\text{-}meas}$ to the d-axis current comparator 320d and the q-axis current comparator 320q, respectively, via the d-axis current feedback loop 352d and the q-axis current feedback loop 352q, respectively. In some examples, the selected angular position $\theta_{select}$ corresponds to the angle θ as discussed with regard to field oriented control systems.

The α-axis voltage $v_\alpha$ and the β-axis voltage $v_\beta$ are provided to the angular position estimator circuitry 330 and the angular velocity estimator circuitry 332 via the α-axis motor voltage node 346a and the β-axis motor voltage node 346b. The α-axis measured current $i_{\alpha\text{-}meas}$ and the β axis measured current $i_{\beta\text{-}meas}$ are provided to the angular position estimator circuitry 330 and the angular velocity estimator circuitry 332 via the α-axis motor current node 344a and the β-axis motor current node 344b. The angular position estimator circuitry 330 and the angular velocity estimator circuitry 332 generate the estimated angular position $\theta_{est}$ and the estimated angular velocity $\omega_{est}$, respectively, based on a back electromotive force of the motor 302, which is determined based on the α-axis voltage $v_\alpha$, the β-axis voltage $v_\beta$, the α-axis measured current $i_{\alpha\text{-}meas}$, and β-axis measured current $i_{\beta\text{-}meas}$.

In some examples, the velocity controller 316, the torque controller 322, and the flux controller 358 are proportional-integral (PI) controllers or some other suitable controllers.

Any of the circuits, circuitry, comparators, controllers, or the like referred to throughout the description may, for example, be or include hardware, software, a combination of hardware and software, or the like.

Figure 4:
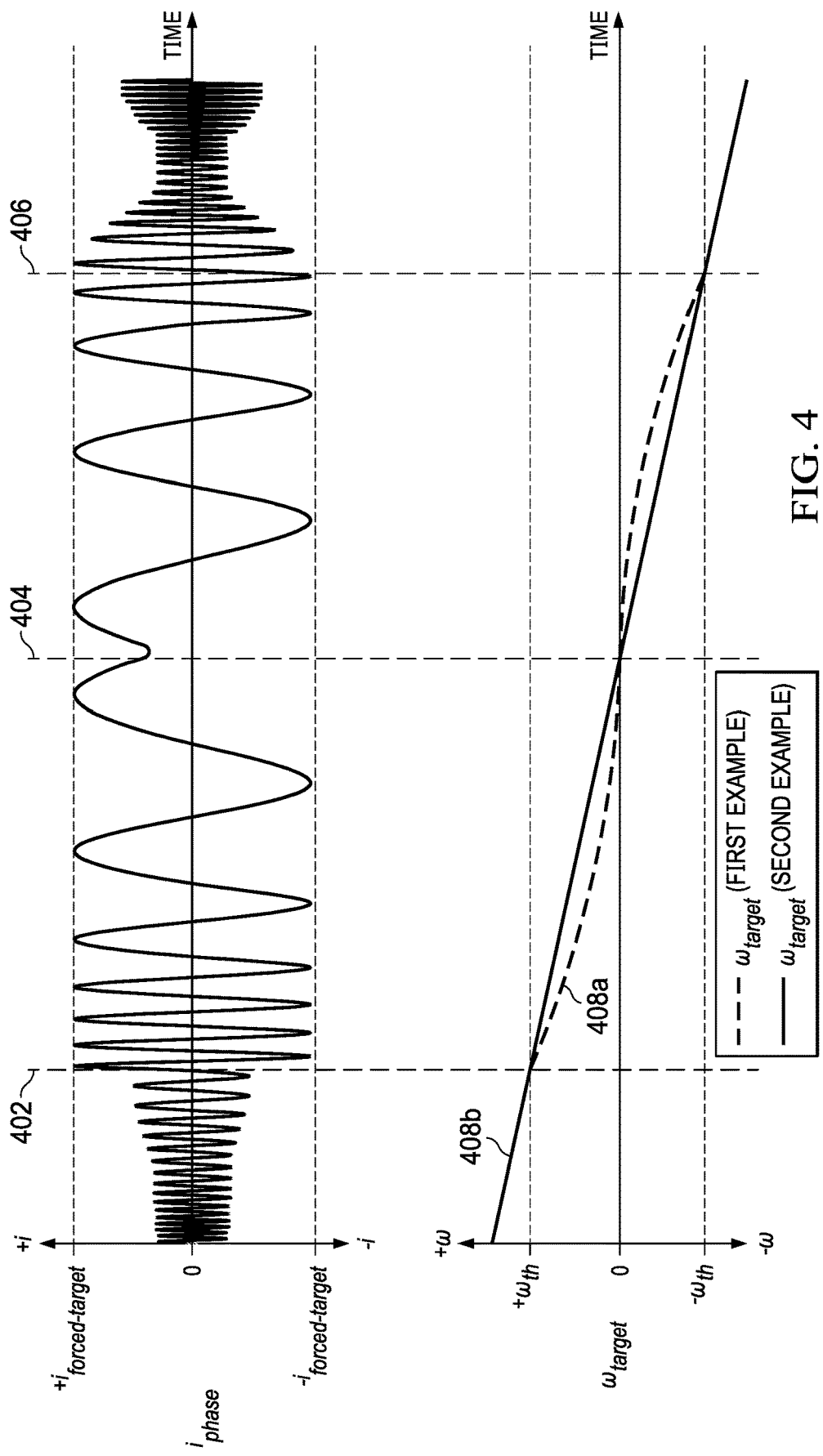
FIG. 4 is a graph of some examples of a single phase current signal of a motor drive signal over time and a target angular velocity over the time.

FIG. 4 is a graph of current versus time and angular velocity versus time for some examples of a single phase current signal $i_{phase}$ of a motor drive signal over time and a target angular velocity $\omega_{target}$ over the time.

The single phase current signal $i_{phase}$ may, for example, be an A-phase drive current (e.g., $i_{a\text{-}drive}$ of FIG. 3), a B-phase drive current (e.g., $i_{b\text{-}drive}$ of FIG. 3), or a C-phase drive current (e.g., $i_{c\text{-}drive}$ of FIG. 3). In other words, the single phase current signal $i_{phase}$ may, for example, be a single phase of a multi-phase motor drive current signal (e.g., $i_{drive}$ of FIG. 1).

When reversing the velocity of the motor, the target angular velocity $\omega_{target}$ is decreased over time. At a first time 402, a magnitude of the target angular velocity $\omega_{target}$ falls below a magnitude of a threshold angular velocity $\omega_{th}$. At a second time 404 the target angular velocity $\omega_{target}$ crosses through zero (e.g., the target angular velocity is reversed). At a third time 406, the magnitude of the target angular velocity $\omega_{target}$ rises above the magnitude of the threshold angular velocity $\omega_{th}$.

The amplitude of the signal phase current signal $i_{phase}$ varies while the magnitude of the target angular velocity $\omega_{target}$ is greater than the magnitude of the threshold angular velocity $\omega_{th}$ (e.g., before the first time 402 and/or after the third time 406). For example, while the magnitude of the target angular velocity $\omega_{target}$ is greater than the magnitude of the threshold angular velocity $\omega_{th}$, the amplitude of the signal phase current signal $i_{phase}$ is based on a calculated target current (e.g., $i_{calc\text{-}target}$ of FIG. 1 or $i_{q\text{-}calc\text{-}target}$ of FIG. 3) that is generated by a velocity controller (e.g., 116 of FIG. 1 or 316 of FIG. 3), as described above with reference to FIG. 1. The velocity controller may vary the calculated target current to control the velocity of the motor according to the target angular velocity $\omega_{target}$, and hence the amplitude of the signal phase current signal $i_{phase}$ may vary.

The amplitude of the signal phase current signal $i_{phase}$ is fixed while the magnitude of the target angular velocity $\omega_{target}$ is less than the magnitude of the threshold angular velocity $\omega_{th}$ (e.g., after the first time 402 and before the third time 406). For example, while the magnitude of the target angular velocity $\omega_{target}$ is less than the magnitude of the threshold angular velocity $\omega_{th}$, the amplitude of the signal phase current signal $i_{phase}$ is based on a forced target current (e.g., $i_{forced\text{-}target}$ of FIG. 1 of $i_{q\text{-}forced\text{-}target}$ of FIG. 3) that is received from a forced target current terminal (e.g., 136 of FIG. 1 or 336 of FIG. 3), as described above with reference to FIG. 1. The forced target current is fixed (e.g., has a constant magnitude) to control the torque generated by the motor, and hence the amplitude of the signal phase current signal $i_{phase}$ is fixed.

In other words, when the magnitude of the target angular velocity $\omega_{target}$ falls below the magnitude of the threshold angular velocity $\omega_{th}$ (e.g., at the first time 402), the motor controller transitions from "closed-loop velocity control", where the current amplitude may vary, to "open-loop current control", where the current amplitude is fixed. Similarly, when the magnitude of the target angular velocity $\omega_{target}$ subsequently rises above the magnitude of the threshold angular velocity $\omega^{th}$ (e.g., at the third time 406), the motor controller transitions from "open-loop current control" to "closed-loop velocity control".

The frequency of the single phase current signal $i_{phase}$ decreases with the decrease in the target angular velocity $\omega_{target}$. When the target angular velocity $\omega_{target}$ reaches zero (e.g., at the second time 404), the single phase current signal $i_{phase}$ is time-reversed. In other words, when the target reaches zero, the $\omega_{target}$ angular velocity single phase current signal $i_{phase}$ follows the deceleration scheme in reverse.

In some examples, while the magnitude of the target angular velocity $\omega_{target}$ is less than the magnitude of the threshold angular velocity $\omega_{th}$, the target angular velocity $\omega_{target}$ and, hence, the frequency of the single phase current signal $i_{phase}$ decrease or increase in a non-linear fashion, as shown by curve 408a. For example, when the motor is decelerating, the target angular velocity $\omega_{target}$ and the frequency of the single phase current signal $i_{phase}$ may correspond to equation 1:

$$f_{decel}(t)=\alpha_1(T-t)+0.5*\alpha_2*(T-t)^2 \quad \text{EQ. 1}$$

where f is the frequency of the single phase current signal $i_{phase}$, t is time, T is the time from when the magnitude of the target angular velocity $\omega_{target}$ drops below the magnitude of the threshold angular velocity $\omega_{th}$ to when the target angular velocity $\omega_{target}$ reaches zero (e.g., the time from the first time 402 to the second time 404), al is a first tuning variable, and $\alpha_2$ is a second tuning variable. Thus, during deceleration, the frequency of the single phase current signal $i_{phase}$ is decreased more quickly at higher velocities and is decreased less quickly at lower velocities. Similarly, when the motor is accelerating, the target angular velocity $\omega_{target}$ and the frequency of the single phase current signal $i_{phase}$ may correspond to equation 2:

$$f_{accel}(t)=\alpha_1*t+0.5*\alpha_2*t^2 \quad \text{EQ. 2}$$

Thus, during acceleration, the frequency of the single phase current signal $i_{phase}$ is increased less quickly at lower velocities and is increased more quickly at higher velocities. By decelerating and accelerating in accordance with these second order equations, the velocity of the motor may be reversed more quickly. Tuning variables $\alpha_1$ and $\alpha_2$ may be tuned to achieve a desired deceleration and/or acceleration profile.

In some other examples, while the magnitude of the target angular velocity $\varphi_{target}$ is less than the magnitude of the threshold angular velocity $\omega_{th}$, the target angular velocity $\omega_{target}$ and hence the frequency of the single phase current signal $i_{phase}$ decrease or increase in a linear fashion, as shown by curve 408b.

Figure 5:
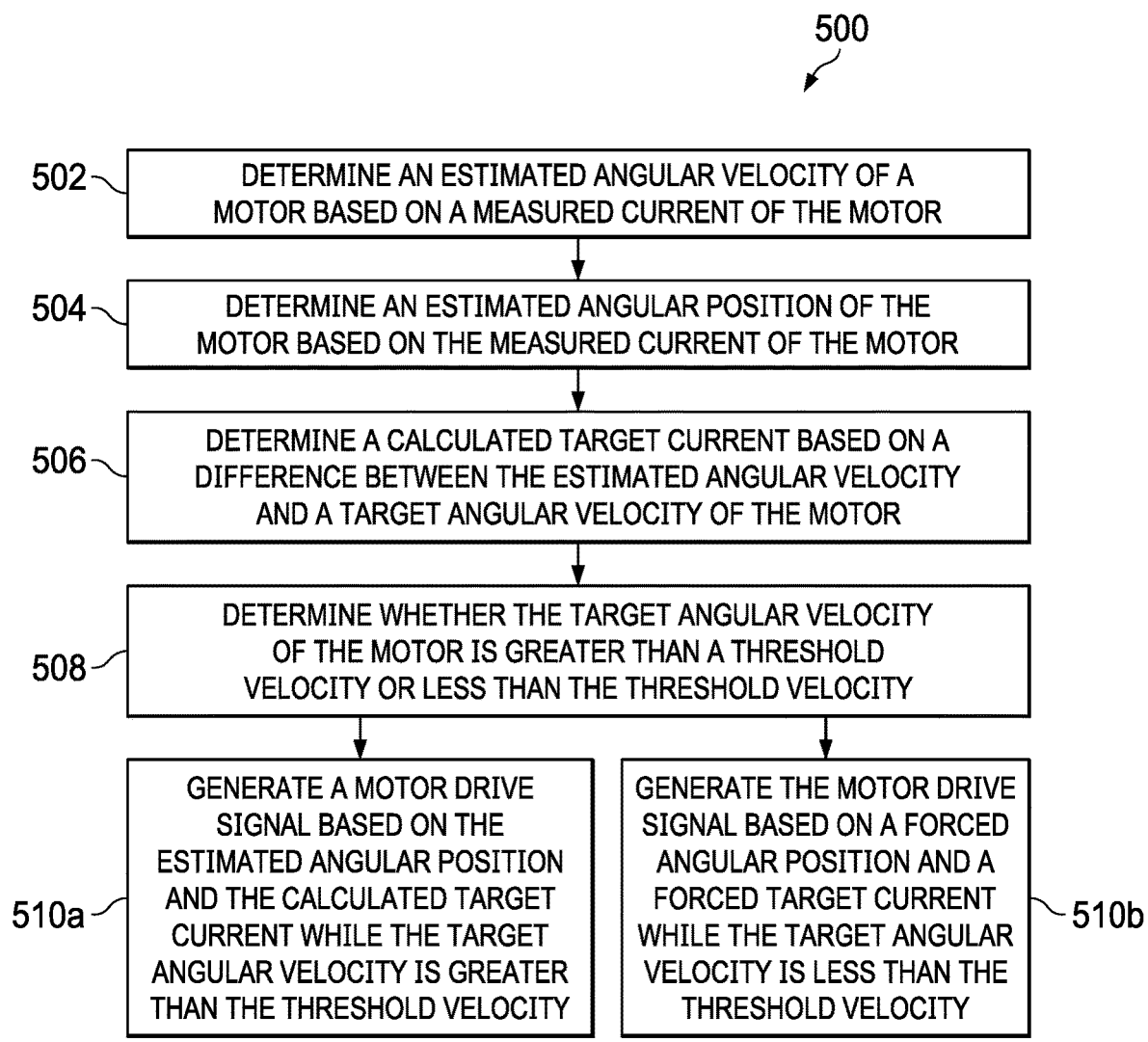
FIG. 5 is a flow diagram of a method for controlling a BLDC motor.

FIG. 5 is a flow diagram of a method 500 for controlling a BLDC motor.

At 502, determine an estimated angular velocity of a motor based on a measured current of the motor. For example, an angular velocity estimator circuitry (e.g., 132 of FIG. 1 or 332 of FIG. 3) is configured to determine the estimated angular velocity (e.g., $\omega_{est}$ of FIG. 1 and FIG. 3) based on a measured current of the motor (e.g., $i_{motor}$ of FIG. 1 or is-meas and $i_{\beta\text{-}meas}$ of FIG. 3).

At 504, determine an estimated angular position of the motor based on the measured current of the motor. For example, an angular position estimator circuitry (e.g., 130 of FIG. 1 or 330 of FIG. 3) is configured to determine the estimated angular position (e.g., $\theta_{est}$ of FIG. 1 and FIG. 3) based on a measured current of the motor (e.g., $i_{motor}$ of FIG. 1 or $i_{\alpha\text{-}meas}$ and $i_{\beta\text{-}meas}$ of FIG. 3).

At 506, determine a calculated target current based on a difference between the estimated angular velocity and a target angular velocity of the motor. For example, a velocity controller (e.g., 116 of FIG. 1 or 316 of FIG. 3) is configured to determine the calculated target current (e.g., $i_{calc\text{-}target}$ of $i_{q\text{-}calc\text{-}target}$ of FIG. 3) based on a velocity error signal (e.g., $\omega_{error}$ of FIG. 1 and FIG. 3) that is based on a difference between the estimated angular velocity d a target angular velocity (e.g., $\omega_{target}$ of FIG. 1 and FIG. 3) of the motor.

At 508, determine whether the target angular velocity of the motor is greater than a threshold angular velocity or less than the threshold angular velocity. For example, a threshold comparator (e.g., 126 of FIG. 1 or 326 of FIG. 3) is configured to determine whether the target angular velocity is greater than a threshold angular velocity (e.g., $\omega_{th}$ of FIG. 1 and FIG. 3) or less than the threshold angular velocity.

At 510a, generate a motor drive signal based on the estimated angular position and the calculated target current while the target angular velocity is greater than the threshold angular velocity. For example, a current generator (e.g., 124 of FIG. 1 or 324 of FIG. 3) is configured to generate a motor drive signal (e.g., drive of FIG. 1 or $i_{a\text{-}drive}$, $i_{b\text{-}drive}$, and $i_{c\text{-}drive}$ FIG. 3) based on the estimated angular position and the calculated target current while the target angular velocity is greater than the threshold angular velocity.

At 510b, generate the motor drive signal based on a forced angular position and a forced target current while the target angular velocity is less than the threshold angular velocity. For example, the current generator is configured to generate the motor drive signal based on a forced angular position (e.g., $\theta_{forced}$ of FIG. 1 and FIG. 3) and a forced target current (e.g., $i_{forced\text{-}target}$ of FIG. 1 or $i_{q\text{-}forced\text{-}target}$ of FIG. 3) while the target angular velocity is less than the threshold angular velocity. In some examples, the forced angular position is based on the target angular velocity, and is independent of both the estimated angular position and the estimated angular velocity. In some examples, the forced target current has a constant magnitude that is based on a target torque.

Figure 6A:
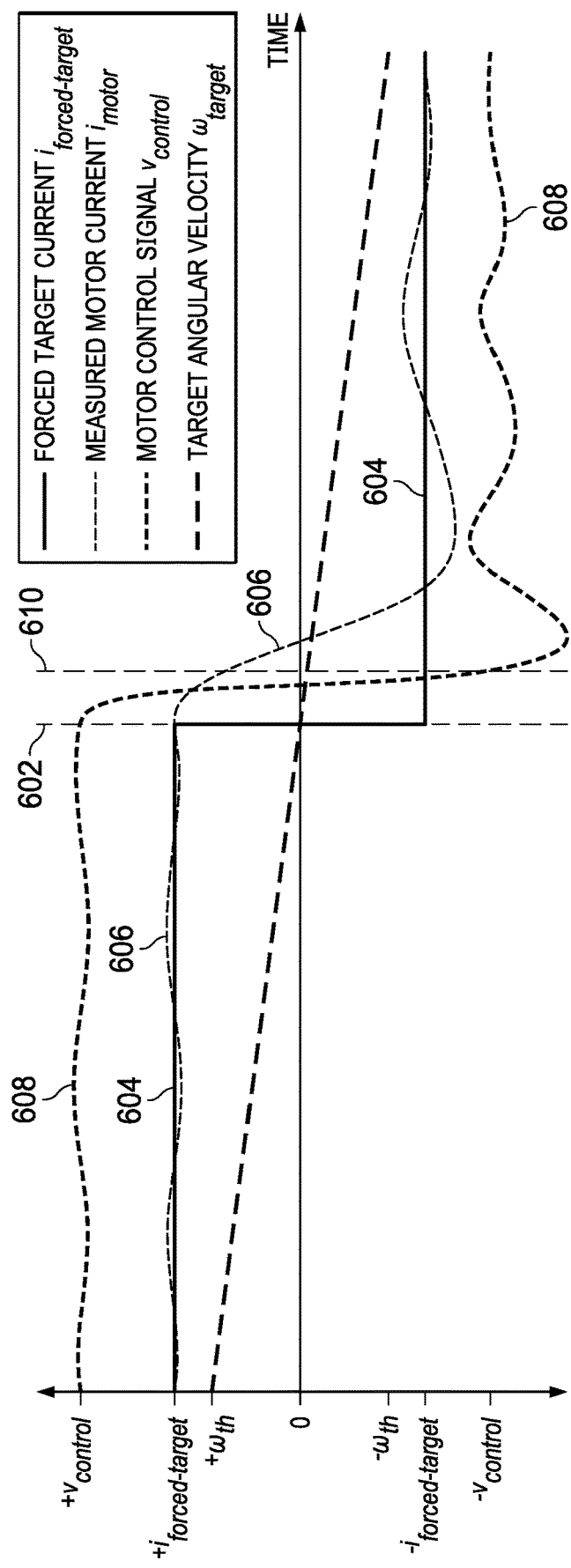
FIGS. 6A and 6B are graphs of some examples of a forced target current, a measured motor current, a motor control signal, and a target angular velocity over time.
Figure 6B:
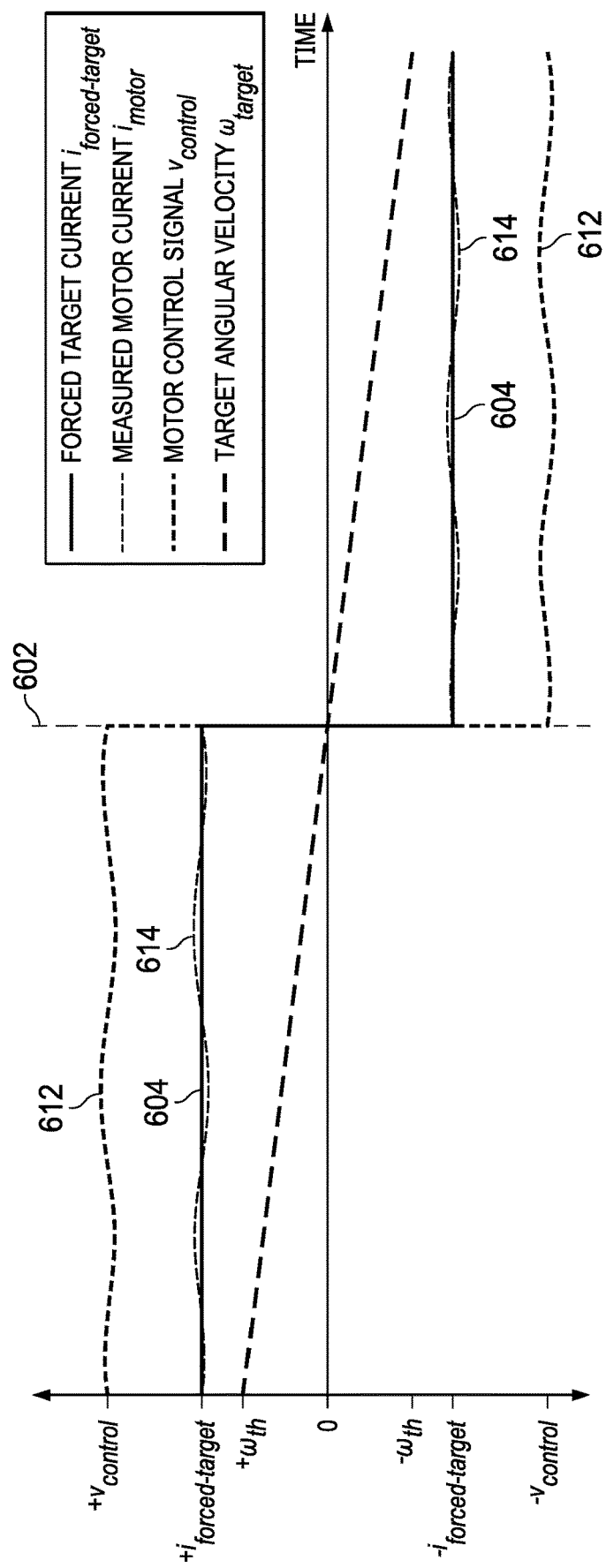

FIGS. 6A and 6B are graphs of voltage/current/angular velocity versus time for some examples of a forced target current $i_{forced\text{-}target}$, a measured motor current $i_{motor}$, a motor control signal $v_{control}$, and a target angular velocity $\omega_{target}$ over time.

When reversing the velocity of a motor (e.g., 102 of FIG. 1), a sign of the forced target current $i_{forced\text{-}target}$ is changed at the time of velocity reversal (e.g., when the target angular velocity $\omega_{target}$ crosses zero at a first time 602), as discussed with regard to FIG. 1 and as shown by curve 604 of FIGS. 6A and 6B. When the sign of the forced target current $i_{forced\text{-}target}$ is changed, a difference between the forced target current $i_{forced\text{-}target}$ and the measured motor current $i_{motor}$ changes greatly, as shown by curves 604, 606 of FIG. 6A. Thus, the motor control signal $v_{control}$, which is based on the difference between the forced target current $i_{forced\text{-}target}$ and the measured motor current $i_{motor}$, also changes greatly, as shown by curve 608 of FIG. 6A. Because a torque controller (e.g., 122 of FIG. 1) that generates the motor control signal $v_{control}$ has a finite bandwidth, it may take considerable time for the motor control signal $v_{control}$ to reach a new steady-state (e.g., to reach $-v_{control}$ from $+v_{control}$), as shown by curve 608 of FIG. 6A. It may also take considerable time for the measured motor current $i_{motor}$ to reach the new value of the forced target current $i_{forced-target}$, as shown by curve 606 of FIG. 6A. For example, the motor control signal $v_{control}$ and the measured motor current $i_{motor}$ may not approach their new steady states until a second time 610. During the time between when the sign of the forced target current $i_{forced-target}$ is changed to when the motor control signal $v_{control}$ and the measured motor current $i_{motor}$ approach and/or reach their new steady states (e.g., during the time between the first time 602 and the second time 610), the motor may lose synchronization and/or may stall (e.g., because the motor measured current $i_{motor}$ passes through zero during that time).

Thus, a motor controller (e.g., 104 of FIG. 1) is configured to change the sign of the motor control signal $v_{control}$ and change the sign of the measured motor current $i_{motor}$ when the target angular velocity $\omega_{target}$ crosses zero (e.g., at the first time 602), as shown by curves 612, 614 of FIG. 6B. By changing the sign of the motor control signal $v_{control}$ and the sign of the measured motor current motor in addition to changing the sign of the forced target current $i_{forced-target}$ when the target angular velocity $\omega_{target}$ crosses zero, a time taken for the motor control signal $v_{control}$ and the measured motor current motor to reach their new steady states may be reduced, as shown by curves 612, 614 of FIG. 6B. Thus, a likelihood of the motor losing synchronization may also be reduced (e.g., because the motor measured current $i_{motor}$ does not pass through zero during velocity reversal).

In some examples where the torque controller is a PI controller, changing the sign of the motor control signal $v_{control}$ may be accomplished by changing the sign of the integrator of the torque controller. For example, before the target angular velocity $\omega_{target}$ crosses zero (e.g., before the first time 602), the torque controller may generate the motor control signal $v_{control}$ based on the following equation 3:

$$v_{control}(t) = K_p e(t) + K_i \int_0^t e(t) \quad \text{EQ. 3}$$

where $v_{control}(t)$ is the motor control signal over time, t is time, $K_p$ is the proportional gain, $K_i$ is the integral gain, and e(t) is a current error signal $i_{error}$ that is based on the difference between the forced target current $i_{force-target}$ and the measured motor current $i_{motor}$. Further, when the target angular velocity $\omega_{target}$ crosses zero and after (e.g., at the first time 602 and after the first time 602), the torque controller may be configured to alternatively generate the motor control signal $v_{control}$ based on the following equation 4:

$$v_{control}(t) = K_p e(t) + K_i(-\int_0^{t_1} e(t) + \int_{t_1}^t e(t)) \quad \text{EQ. 4}$$

where $t_1$ is the time when the target angular velocity $\omega_{target}$ crosses zero (e.g., the first time 602). Thus, in some examples, the torque controller is configured to change the sign of the motor control signal $v_{control}$ when the target angular velocity $\omega_{target}$ crosses zero by switching from generating the motor control signal $v_{control}$ based on equation 3 to generating the motor control signal $v_{control}$ based on equation 4 when the target angular velocity $\omega_{target}$ crosses zero.

In some examples where the measured motor current $i_{motor}$ is based, in part, on a selected angular position $\theta_{select}$, changing the sign of the measured motor current $i_{motor}$ may be accomplished by changing the selected angular position $\theta_{select}$ by 180 degrees. Further, because the selected angular position $\theta_{select}$ is the forced angular position $\theta_{forced}$ during velocity reversal (e.g., when the magnitude of the target angular velocity $\omega_{target}$ is less than the magnitude of the threshold angular velocity $\omega_{th}$), changing the sign of the measured motor current $i_{motor}$ may be accomplished by changing the forced angular position $\theta_{forced}$ by 180 degrees. Thus, in some examples, second switching circuitry (e.g., 128 of FIG. 1) is configured to change the sign of the measured motor current $i_{motor}$ when the target angular velocity $\omega_{target}$ crosses zero by changing the forced angular position $\theta_{forced}$ by 180 degrees when the target angular velocity $\omega_{target}$ crosses zero.

In some examples, the signs of the forced target current $i_{force-target}$, the measured motor current $i_{motor}$, and the motor control signal $v_{control}$ may only need to be changed when the target angular velocity crosses zero if the angular velocity of the motor is reduced using a motoring process (e.g., where a motor current vector is leading a rotor flux vector). If the angular velocity of the motor is alternatively reduced using a braking process (e.g., where the motor current vector is lagging the rotor flux vector), the signs of the forced target current $i_{force-target}$, the measured motor current $i_{motor}$, and the motor control signal $v_{control}$ may not need to be changed when the target angular velocity $\omega_{target}$ crosses zero (e.g., the signs are maintained).

Figure 7:
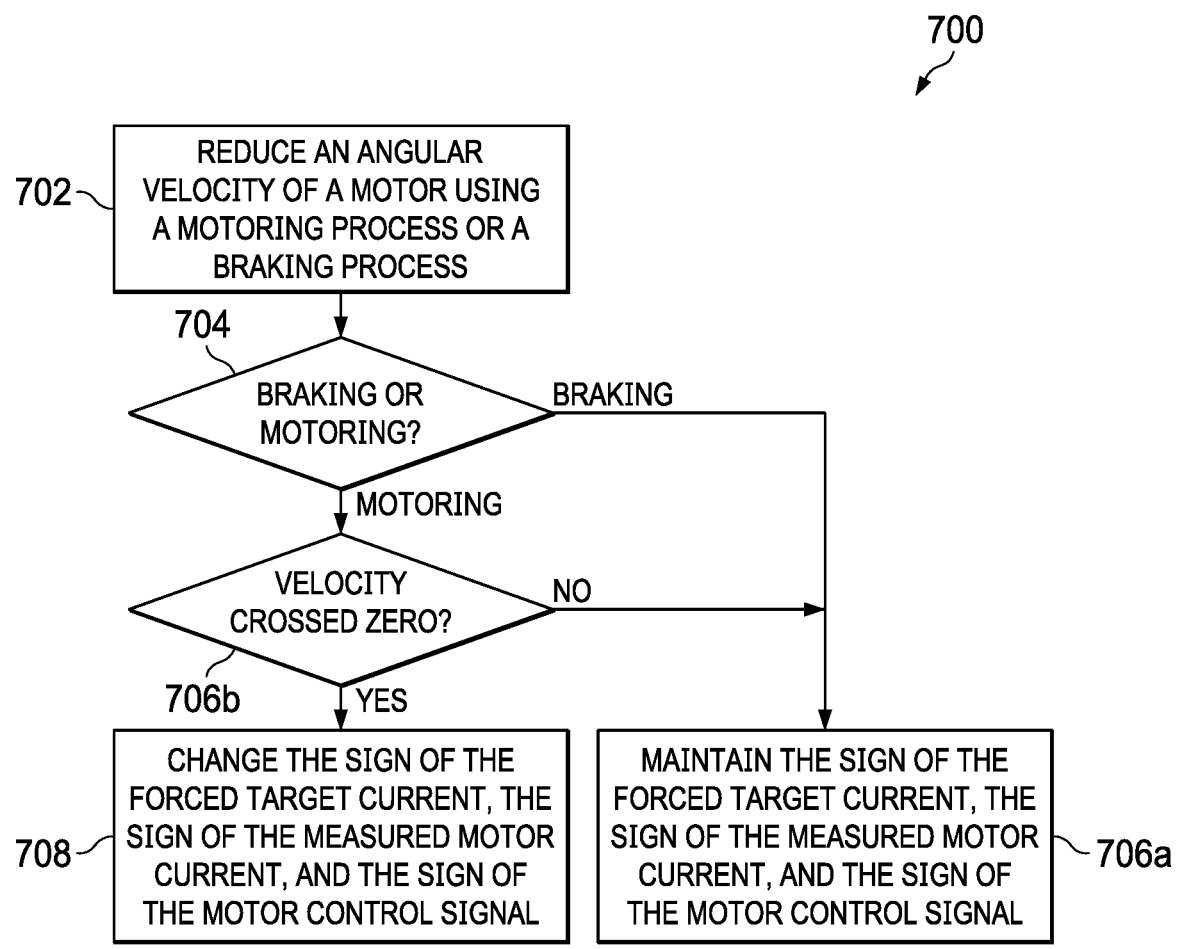
FIG. 7 is a flow diagram of some examples of a method for controlling a BLDC motor when reversing an angular velocity of the BLDC motor.

FIG. 7 is a flow diagram of some examples of a method 700 for controlling a BLDC motor when reversing an angular velocity of the BLDC motor.

At 702, reduce an angular velocity of a motor using a motoring process or a braking process.

At 704, determine whether the angular velocity of the motor was reduced using the motoring process of the braking process. If the angular velocity of the motor was reduced using the braking process, proceed to 706a. If the angular velocity of the motor was reduced using the motoring process, proceed to 706b.

At 706a, maintain the sign of the forced target current, the sign of the measured motor current, and the sign of the motor control signal.

At 706b, determine whether the angular velocity of the motor has crossed zero. If the angular velocity of the motor has not crossed zero, proceed to 706a. If the angular velocity of the motor has crossed zero, proceed to 708.

At 708, change the sign of the forced target current, the sign of the measured motor current, and the sign of the motor control signal.

Thus, the present description relates to a motor controller and a method for controlling a motor so that the motor does not lose synchronization during low velocities and during velocity reversal.

The methods are illustrated and described above as a series of acts or events, but the illustrated ordering of such acts or events is not limiting. For example, some acts or events may occur in different orders and/or concurrently with other acts or events apart from those illustrated and/or described herein. Also, some illustrated acts or events are optional to implement one or more aspects or embodiments of this description. Further, one or more of the acts or events depicted herein may be performed in one or more separate acts and/or phases. In some embodiments, the methods described above may be implemented in a computer readable medium using instructions stored in a memory.

In this description, the term "couple" may cover connections, communications or signal paths that enable a functional relationship consistent with this description. Accordingly, if device A generates a signal to control device B to perform an action, then: (a) in a first example, device A is coupled directly to device B; or (b) in a second example, device A is coupled to device B through intervening component C if intervening component C does not substantially alter the functional relationship between device A and device B, so device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead. For example, a p-type metal-oxide-silicon FET ("MOSFET") may be used in place of an n-type MOSFET with little or no changes to the circuit. Furthermore, other types of transistors may be used (such as bipolar junction transistors (BJTs)).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications are possible in the described examples, and other implementations are possible, within the scope of the claims.

What is claimed is:

1. A motor controller operable to control a motor, the motor having a first terminal and the motor controller comprising:
    an angular velocity transmission path having an input and an output;
    a current generator having a velocity-torque input, an angular position input, and a motor drive output, the velocity-torque input coupled to the output of the angular velocity transmission path, wherein the current generator is configured to provide a motor drive signal to each winding of the motor;
    an angular velocity feedback path coupled between the first terminal and a first location on the angular velocity transmission path, the first location coupled between the input and the output of the angular velocity transmission path;
    a current feedback path coupled between the first terminal and a second location on the angular velocity transmission path, the second location disposed between the first location on the angular velocity transmission path and the velocity-torque input of the current generator; and
    a first switching circuitry disposed between the first location and the second location on the angular velocity transmission path, the first switching circuitry having a first input switching terminal coupled to the input of the angular velocity transmission path, a second input switching terminal coupled to a forced target current, and an output switching terminal coupled to the velocity-torque input of the current generator.

2. The motor controller of claim 1, wherein the angular velocity transmission path comprises:
    a velocity controller arranged between the first location and the second location; and
    a torque controller arranged between the second location and the current generator.

3. The motor controller of claim 1, wherein the angular velocity transmission path further comprises:
    an angular velocity comparator having a first input coupled to the input of the angular velocity transmission path, a second input coupled to the angular velocity feedback path, and an output coupled to the first input switching terminal of the first switching circuitry.

4. The motor controller of claim 1, further comprising:
    an angular position feedback path including an angular position estimator coupled between the first terminal and the angular position input of the current generator; and
    a second switching circuitry disposed on the angular position feedback path, the second switching circuitry having a first input switching terminal coupled to the angular position estimator, a second input switching terminal coupled to a forced angular position, and an output switching terminal coupled to the angular position input of the current generator.

5. The motor controller of claim 4, further comprising:
    a comparator having a first input coupled to the input of the angular velocity transmission path, a second input coupled an angular velocity threshold value, and an output coupled to a first switching control terminal of the first switching circuitry and coupled to a second switching control terminal of the second switching circuitry.

6. A method for controlling a motor, the method comprising:
    determining an estimated angular velocity of the motor based on a measured current of the motor;

determining an estimated angular position of the motor based on the measured current of the motor;

determining a calculated target current based on a difference between the estimated angular velocity and a target angular velocity of the motor;

determining whether the target angular velocity of the motor is greater than a threshold angular velocity or less than the threshold angular velocity;

generating a motor drive signal based on the estimated angular position and the calculated target current while the target angular velocity is greater than the threshold angular velocity; and generating the motor drive signal based on a forced angular position and a forced target current while the target angular velocity is less than the threshold angular velocity.

7. The method of claim 6, wherein the forced angular position is based on the target angular velocity and is independent of both the estimated angular position and the estimated angular velocity, and wherein the forced target current has a constant magnitude.

8. The method of claim 6, further comprising:
generating a motor control signal based on a difference between the forced target current and the measured current while the target angular velocity is less than the threshold angular velocity, wherein the motor drive signal is generated based on the forced angular position and the motor control signal while the target angular velocity is less than the threshold angular velocity.

9. The method of claim 8, further comprising:
changing a sign of the motor control signal in response to the target angular velocity reaching zero.

10. The method of claim 9, further comprising:
changing a sign of the forced target current in response to the target angular velocity reaching zero; and
changing a sign of the measured current in response to the target angular velocity reaching zero.

11. The method of claim 9, wherein the measured current is based on the forced angular position while the target angular velocity is less than the threshold angular velocity, and wherein the method further comprises:
changing a sign of the forced target current in response to the target angular velocity reaching zero; and
changing the forced angular position by 180 degrees in response to the target angular velocity reaching zero.

12. A motor controller operable to control a motor, comprising:
an angular position estimator circuitry coupled to a first terminal, configured to receive a measured current of the motor, and configured to determine an estimated angular position of the motor based on the measured current;
an angular velocity estimator circuitry coupled to the first terminal, configured to receive the measured current of the motor, and configured to determine an estimated angular velocity of the motor based on the measured current; and
a multiphase current generator coupled to a motor drive terminal, selectively coupled to the angular position estimator circuitry, configured to receive either the estimated angular position or a forced angular position of the motor, configured to receive a motor control signal that is based on either a calculated target current or a forced target current, and configured to generate a motor drive signal based on the motor control signal and either the estimated angular position or the forced angular position,
wherein the motor drive signal is based on the calculated target current and the estimated angular position while a target angular velocity is greater than a threshold angular velocity, and wherein the motor drive signal is based on the forced target current and the forced angular position while the target angular velocity is less than the threshold angular velocity.

13. The motor controller of claim 12, wherein the motor control signal is based on a difference between either the calculated target current or the forced target current and the measured current of the motor.

14. The motor controller of claim 12, wherein the calculated target current is based on a difference between the target angular velocity and the estimated angular velocity, and wherein the forced target current has constant magnitude.

15. The motor controller of claim 12, wherein the forced angular position is based on the target angular velocity and is independent of both the estimated angular velocity and the estimated angular position.

16. The motor controller of claim 12, wherein the angular position estimator circuitry is further configured to determine the estimated angular position based on a voltage of the motor and wherein the angular velocity estimator circuitry is further configured to determine the estimated angular velocity based on the voltage.

17. The motor controller of claim 12, further comprising:
a velocity comparator coupled to the angular velocity estimator circuitry, coupled to a target angular velocity input, configured to receive the target angular velocity, configured to receive the estimated angular velocity, and configured to output an angular velocity error signal based on a difference between the target angular velocity and the estimated angular velocity; and
a velocity controller coupled to the velocity comparator, configured to receive the angular velocity error signal, and configured to output the calculated target current based on the angular velocity error signal.

18. The motor controller of claim 17, further comprising:
a current comparator coupled to the first terminal, selectively coupled to the velocity controller, configured to receive either the calculated target current or the forced target current, configured to receive the measured current of the motor, and configured to output a current error signal based on a difference between either the calculated target current or the forced target current and the measured current; and
a torque controller coupled to the current comparator, coupled to the multiphase current generator, configured to receive the current error signal, and configured to output the motor control signal based on the current error signal.

19. The motor controller of claim 18, wherein the torque controller is further configured to change a sign of the motor control signal in response to the target angular velocity reaching zero, wherein the motor controller is configured to change a sign of the forced target current in response to the target angular velocity reaching zero, and wherein the motor controller is further configured to change the forced angular position by 180 degrees in response to the target angular velocity reaching zero.

* * * * *